United States Patent
Park et al.

(10) Patent No.: US 7,720,603 B2
(45) Date of Patent: May 18, 2010

(54) METHOD AND APPARATUS FOR PROVIDING GPS DATA USING NETWORK

(75) Inventors: Mi Ryong Park, Daejeon (KR); Tae Man Han, Daejeon (KR); Man Seok Yang, Daejeon (KR); Dong Sun Lim, Daejeon (KR)

(73) Assignee: Electronics and Telecommunications Research Institute, Daejeon (KR)

( * ) Notice: Subject to any disclaimer, the term of this patent is extended or adjusted under 35 U.S.C. 154(b) by 267 days.

(21) Appl. No.: 11/873,743

(22) Filed: Oct. 17, 2007

(65) Prior Publication Data

US 2008/0097696 A1      Apr. 24, 2008

(30) Foreign Application Priority Data

Oct. 19, 2006     (KR) ...................... 10-2006-0101940

(51) Int. Cl.
*G01C 21/00*          (2006.01)
(52) U.S. Cl. ................... 701/213; 342/357.09; 380/270
(58) Field of Classification Search ................. 380/258, 380/270; 342/357.09; 705/64; 701/213
See application file for complete search history.

(56) References Cited

U.S. PATENT DOCUMENTS

| | | | |
|---|---|---|---|
| 5,757,916 A * | 5/1998 | MacDoran et al. .......... 380/258 |
| 6,950,058 B1 | 9/2005 | Davis et al. | |
| 7,249,100 B2 * | 7/2007 | Murto et al. .................. 705/50 |
| 7,366,892 B2 * | 4/2008 | Spaur et al. ................. 713/151 |
| 2003/0214936 A1 | 11/2003 | Goff | |
| 2005/0052320 A1 | 3/2005 | Tekinay et al. | |
| 2006/0046749 A1 | 3/2006 | Pomerantz et al. | |

FOREIGN PATENT DOCUMENTS

| | | |
|---|---|---|
| JP | 2004-040745 | 2/2004 |
| KR | 1020040049366 | 6/2004 |
| KR | 1020050009458 | 1/2005 |
| KR | 20-0404538 | 12/2005 |
| KR | 1020060013041 | 2/2006 |
| KR | 1020060015691 | 2/2006 |
| KR | 1020060003392 | 11/2006 |
| WO | WO 03/100454 | 12/2003 |
| WO | WO 2006/026757 | 3/2006 |

OTHER PUBLICATIONS

Notice of Allowance for Korean App. 10-2006-0101940.

* cited by examiner

*Primary Examiner*—Mark Hellner
(74) *Attorney, Agent, or Firm*—Lowe Hauptman Ham & Berner LLP

(57) ABSTRACT

Provided is a network global positioning system (GPS) terminal. The network GPS terminal includes: a GPS receiver receiving GPS data; a GPS processor processing the received GPS data to a predetermined form; a network communication part communicating with an external apparatus through a network in order to receive a request for the GPS data from the external apparatus, and transmit the processed GPS data to the external apparatus in response to the request; a security access controller authenticating the external apparatus; and a network management part managing connection information and security information of the external apparatus, the network communication part simultaneously communicating with at least one external apparatus using a TCP/IP protocol. A method of providing GPS data using a network is also provided.

20 Claims, 4 Drawing Sheets

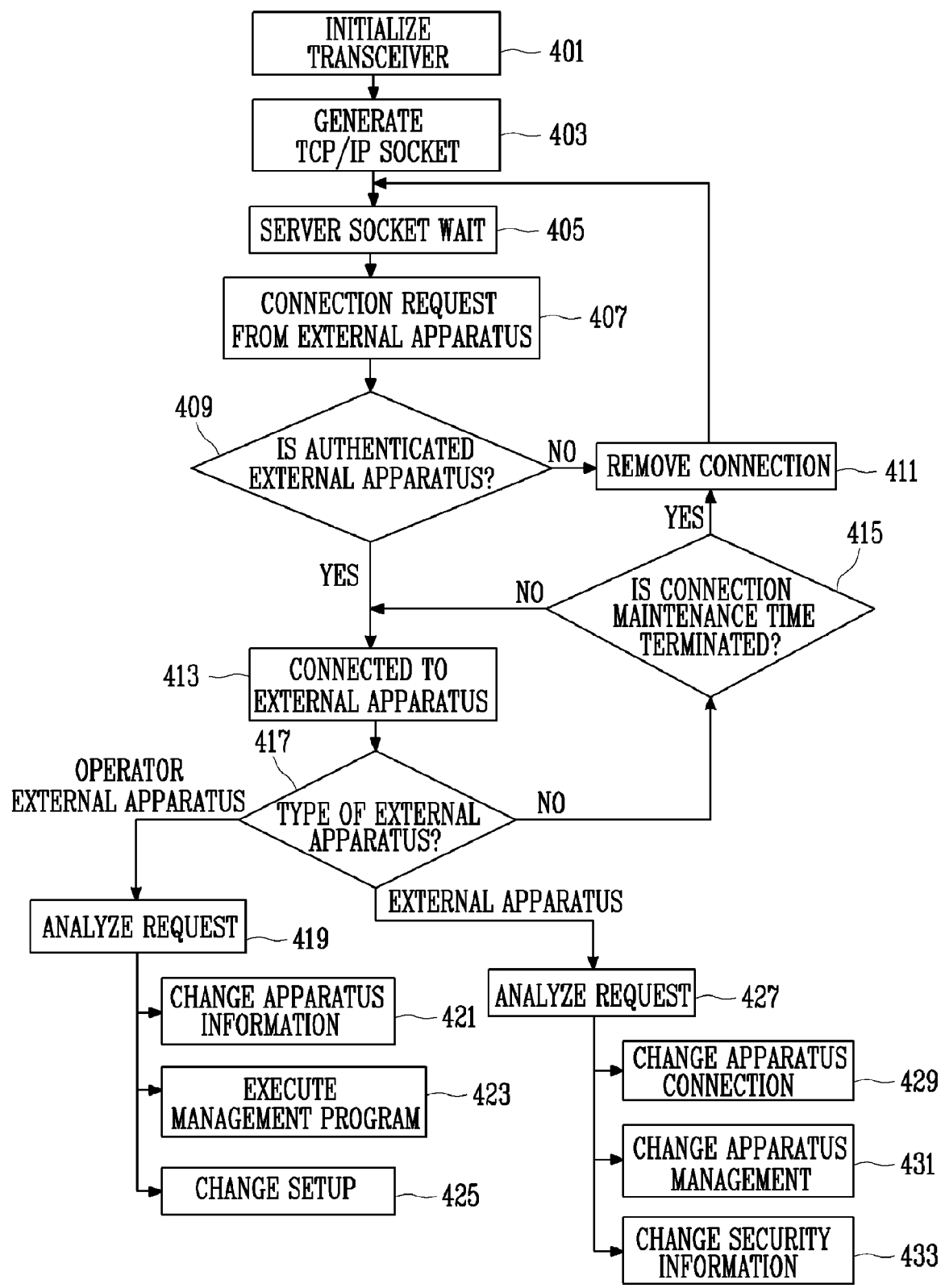

| NO | Name | Type | Comment |
|---|---|---|---|
| 1 | Location_Latitude | float | Latitude |
| 2 | Location_Longitude | float | Logitude |
| 3 | Time | timestamp | Timestamp(utc time of gettimeofday()) |
| 4 | Speed | int | m/s |
| 5 | Direction | Radian | $0 \sim 2\pi$ |
| ⋮ | ⋮ | ⋮ | ⋮ |

510

| No. | APPARATUS RECOGNITION NUMBER | MAC ADDRESS | AUTHENTICATION METHOD | VALIDITY OF AUTHENTICATION | REGISTRATION TIME | REMARKS |
|---|---|---|---|---|---|---|
| 1 | USBWLAN1 | 112233445566 | Password | Y | 20060801 13:42:20 | REQUEST APPARATUS REGISTRATION |
| 2 | PDA1 | 221133224455 | AUTHENTICATION NOTE | N | 20051201 08:12:30 | REMOVE APPARATUS REGISTRATION |
| ⋮ | ⋮ | ⋮ | ⋮ | ⋮ | ⋮ | ⋮ |

520

| No. | APPARATUS RECOGNITION NUMBER | AUTHENTICATION METHOD | AUTHENTICATION KEY | KEY REGISTRATION TIME | VALIDITY TERM | REMARKS |
|---|---|---|---|---|---|---|
| 1 | USBWLAN1 | Password | Xx22yy | 20060802 09:30:14 | 20060901 09:30:14 | |
| 2 | PDA1 | AUTHENTICATION NOTE | FileA | 20051203 10:24:48 | 20060102 10:24:48 | |
| ⋮ | ⋮ | ⋮ | ⋮ | ⋮ | ⋮ | |

METHOD AND APPARATUS FOR PROVIDING GPS DATA USING NETWORK

CROSS-REFERENCE TO RELATED APPLICATION

This application claims priority to and the benefit of Korean Patent Application No. 2006-0101940, filed Oct. 19, 2006, the disclosure of which is incorporated herein by reference in its entirety.

BACKGROUND

1. Field of the Invention

The present invention relates to a method and apparatus for providing global positioning system (GPS) data using a network.

2. Discussion of Related Art

A global positioning system (GPS) apparatus uses a technique capable of accurately determining a terrestrial position using a number of satellites orbiting the earth.

Currently, drivers and passengers are provided with various convenient services through a variety of application programs using a GPS.

However, since the application programs applied to the GPS apparatus are closely related to the GPS, it is difficult to separate a GPS receiver from the program. Therefore, a GPS apparatus with a GPS receiver attached thereto has been developed to be used by a requested application program.

Consequently, a typical GPS receiving apparatus is manufactured to meet requirements of the application program, and has a close relationship with an apparatus in which the application program operates. Specifically, the GPS receiver is in communication with connection equipment through serial communication, and received data is processed by a program of an application apparatus using a GPS reception process, a GPS processing engine, etc. in a number of application apparatuses.

In this case, when there are several apparatuses requesting GPS data, each of the apparatuses is equipped with a GPS receiver to thereby receive the GPS data, and this results in inefficiency.

In particular, in the case of a vehicle for which the GPS apparatus is often used, each apparatus separately receives and processes a GPS signal. This results in the vehicle possibly being disorganized and messy inside, and a waste of resources.

SUMMARY OF THE INVENTION

The present invention is directed to a method and apparatus for providing global positioning system (GPS) data using a network.

Also, the present invention is directed to a method and apparatus for providing GPS data capable of simultaneously providing the GPS data to various kinds of external apparatuses requesting the GPS data using a Transmission Control Protocol/Internet Protocol (TCP/IP) protocol.

Further, the present invention is directed to a method and apparatus for providing GPS data capable of simultaneously providing the GPS data using an internal network to devices that use GPS data in a vehicle having the internal network.

One aspect of the present invention provides a network GPS terminal including: a GPS receiver receiving GPS data; a GPS processor processing the received GPS data to a predetermined form; a network communication part communicating with an external apparatus through a network in order to receive a request for the GPS data from the external apparatus, and transmit the processed GPS data to the external apparatus in response to the request; a security access controller authenticating the external apparatus; and a network management part managing connection information and security information of the external apparatus, the network communication part simultaneously communicating with at least one external apparatus using a TCP/IP protocol.

The GPS receiver may include a GPS antenna receiving a satellite GPS signal. Also, the GPS receiver may include a mobile communication antenna receiving a signal of a mobile communication network including GPS data. The GPS processor may process the GPS data into a form usable by the external apparatus requesting the GPS data. The GPS processor may further include a memory including GPS data, and connection information and security information of the external apparatus.

The GPS data included in the memory may include information on current time, velocity, longitude, latitude, and azimuth angle. Also, the connection information of the external apparatus included in the memory may include information on an apparatus recognition number, an authentication key, an authentication method, authentication key registration time, and a validity term of the authentication key. In addition, the security information of the apparatus included in the memory may include information on an apparatus recognition number, a machine access code (MAC), an authentication method, and registration time. The security access controller may restrict or allow access of the external apparatus.

Another aspect of the present invention provides a method of providing GPS data using a network including the steps of: (a) receiving GPS data; (b) processing the received GPS data into a predetermined form; (c) coupling with an external apparatus through a network; (d) receiving a request for the GPS data from the external apparatus coupled through the network; (e) authenticating the external apparatus; and (f) transmitting the processed GPS data to the authenticated external apparatus through the network, communication with the external apparatus being performed using a TCP/IP protocol.

Step (a) may include the steps of: initializing a GPS receiver; periodically confirming whether the initialized GPS receiver receives a signal including GPS data or not; extracting GPS data from the signal including the GPS data; and storing the extracted GPS data in a memory. However, when the extracted GPS data is unnecessary, the received data may be discarded. In step (b), the received GPS data may be converted into a packet form usable by a TCP/IP protocol. Also, step (b) may further include the step of storing connection information of the external apparatus coupled through the network in an external apparatus connection information database. Further, step (e) may include the steps of: confirming whether an authentication key of the external apparatus exists in a memory or not; confirming whether response key information corresponding to the authentication key of the memory is received from the external apparatus or not; and confirming whether a validity term of the authentication key is expired or not.

Moreover, step (e) may further include the steps of: receiving a request for changing management information from the authenticated external apparatus; and analyzing the change request to thereby change at least one of external apparatus information, an external apparatus connection management program, and an external apparatus connection setup. Furthermore, step (e) may further include the steps of: receiving a request for changing connection information from the authenticated external apparatus; and analyzing the change request to thereby change at least one of external apparatus security information, an external apparatus connection status, and external apparatus connection information.

BRIEF DESCRIPTION OF THE DRAWINGS

The above and other features and advantages of the present invention will become more apparent to those of ordinary skill in the art by describing in detail exemplary embodiments thereof with reference to the attached drawings in which:

FIG. 4 is a flowchart illustrating connection management of an external apparatus in a network management part according to an exemplary embodiment of the present invention; and FIG. 5 illustrates data stored in a memory according to an exemplary embodiment of the present invention.

DETAILED DESCRIPTION OF EMBODIMENTS

The present invention will now be described more fully hereinafter with reference to the accompanying drawings, in which exemplary embodiments of the invention are shown. This invention may, however, be embodied in different forms and should not be construed as limited to the exemplary embodiments set forth herein.

Figure 1:
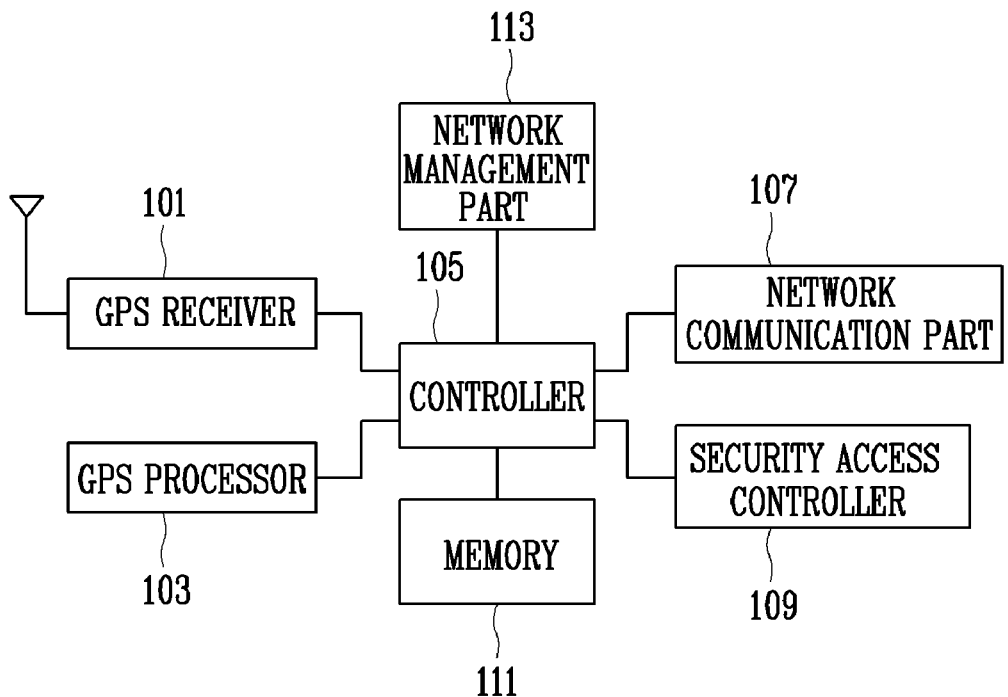
FIG. 1 illustrates a configuration of a global positioning system (GPS) apparatus using a network according to an exemplary embodiment of the present invention.

FIG. 1 illustrates a configuration of a global positioning system (GPS) apparatus using a network according to an exemplary embodiment of the present invention.

Referring to FIG. 1, the GPS apparatus according to the present invention includes a GPS receiver 101, a GPS processor 103, a controller 105, a memory 111, a network management part 113, a network communication part 107, and a security access controller 109.

The GPS receiver 101 serves to receive GPS data in the GPS apparatus according to the present invention. Since a GPS generally receives distance information from a GPS satellite orbiting the earth, the GPS receiver 101 should be able to receive the GPS data transmitted from the GPS satellite. Therefore, in this case, an antenna capable of receiving a GPS signal should be included. Meanwhile, when a position detecting system based on a base station of a mobile communication system is applied, using a mobile communication antenna capable of receiving only a mobile communication signal is sufficient without directly receiving location information from the GPS satellite. As a result, the receiver may have a simpler structure.

The GPS processor 103 serves to process the GPS data received by the GPS receiver 101 to a form usable by other apparatuses and the GPS apparatus of the present invention. Since the GPS apparatus transmits the received GPS data to other apparatuses connected to the GPS apparatus as well, the GPS data should be converted into a form usable by the apparatuses connected to the GPS apparatus.

The controller 105 controls overall operations of the GPS apparatus, and in particular, the controller 105 transmits the GPS data processed by the GPS processor 103 to the other apparatuses coupled with the GPS apparatus. Also, the controller 105 determines whether other apparatuses requesting the GPS apparatus to provide information may be coupled with the GPS apparatus or not.

The memory 111 stores the GPS data processed by the GPS processor 103, and is capable of storing information on other apparatuses that can be coupled with the GPS apparatus and information on apparatuses currently maintaining connections.

The network communication part 107 transmits the GPS data to an external apparatus coupled with the GPS apparatus through a network according to an order of the controller 105, and receives a GPS data request signal from the external apparatus.

In particular, the network communication part 107 may use an open type protocol, a Transmission Control Protocol/Internet Protocol (TCP/IP) protocol, which is irrespective of connection type. Therefore, whichever type of network, i.e., a wired or wireless network is used, a connection to an external apparatus can be easily established.

The security access controller 109 controls access authentication of external apparatuses connected by the network communication part 107. The security access controller 109 allows or prevents access of the external apparatuses requesting access with reference to information on accessible apparatus and apparatus maintaining a connection stored in the memory 111. In particular, when the GPS apparatus is wirelessly connected to the external apparatus, since a connection environment may vary depending on an external environment, it is increasingly becoming necessary to process interruption of other connection signals or an incorrect connection request signal.

The network management part 113 manages connections and releases of the external apparatuses connected to the GPS apparatus. The network management part 113 may be connected using a path different from a general data access path of an external apparatus. Particularly, when the TCP/IP protocol is used, the network management part 113 may use a port different from a data access port.

Also, the network management part 113 may be connected to an operator external apparatus capable of changing access data of the apparatus according to the present invention using a dedicated connection port, so that it changes access data of an external apparatus.

Figure 2:
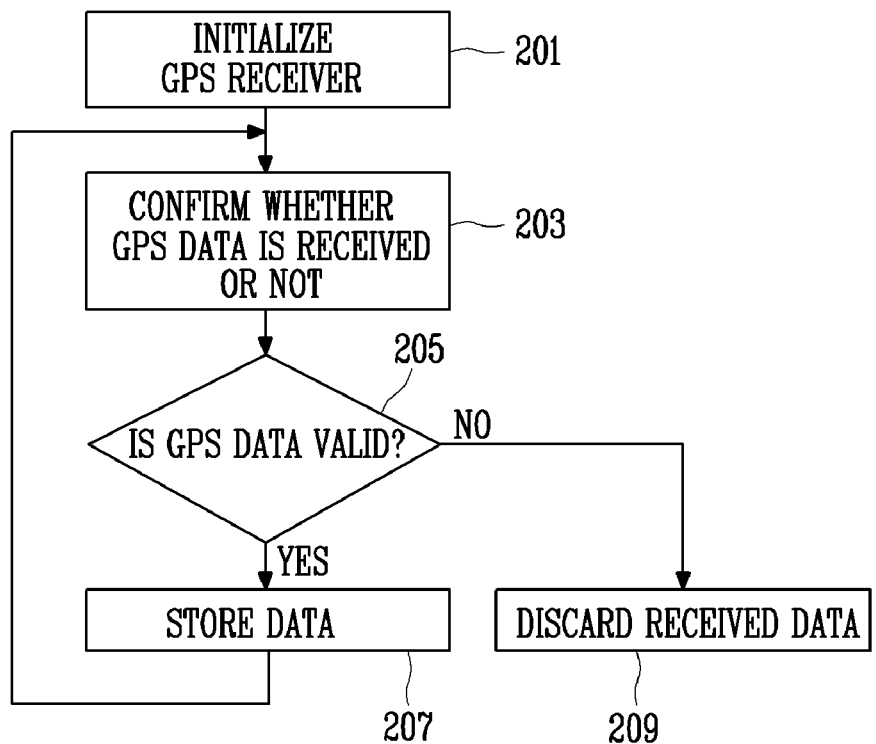
FIG. 2 is a flowchart illustrating a method of receiving a GPS signal according to an exemplary embodiment of the present invention.

FIG. 2 is a flowchart illustrating a method of receiving a GPS signal according to an exemplary embodiment of the present invention.

Referring to FIG. 2, first, to receive the GPS signal, a GPS receiver is initialized (Step 201). Then, reception of data is periodically confirmed as to whether GPS data is received or not (Step 203). When the GPS data is received, it is determined whether the received GPS data is valid or not (Step 205). When the received GPS data is valid data, the data is stored in a memory (Step 207), and reception of GPS data is confirmed again.

Meanwhile, if the received GPS data is not valid, the received data is discarded (Step 209).

Since the reception of the GPS signal is continuously performed and renewed, a position of the GPS apparatus is continuously renewed even when the GPS apparatus is on the move.

Figure 3:
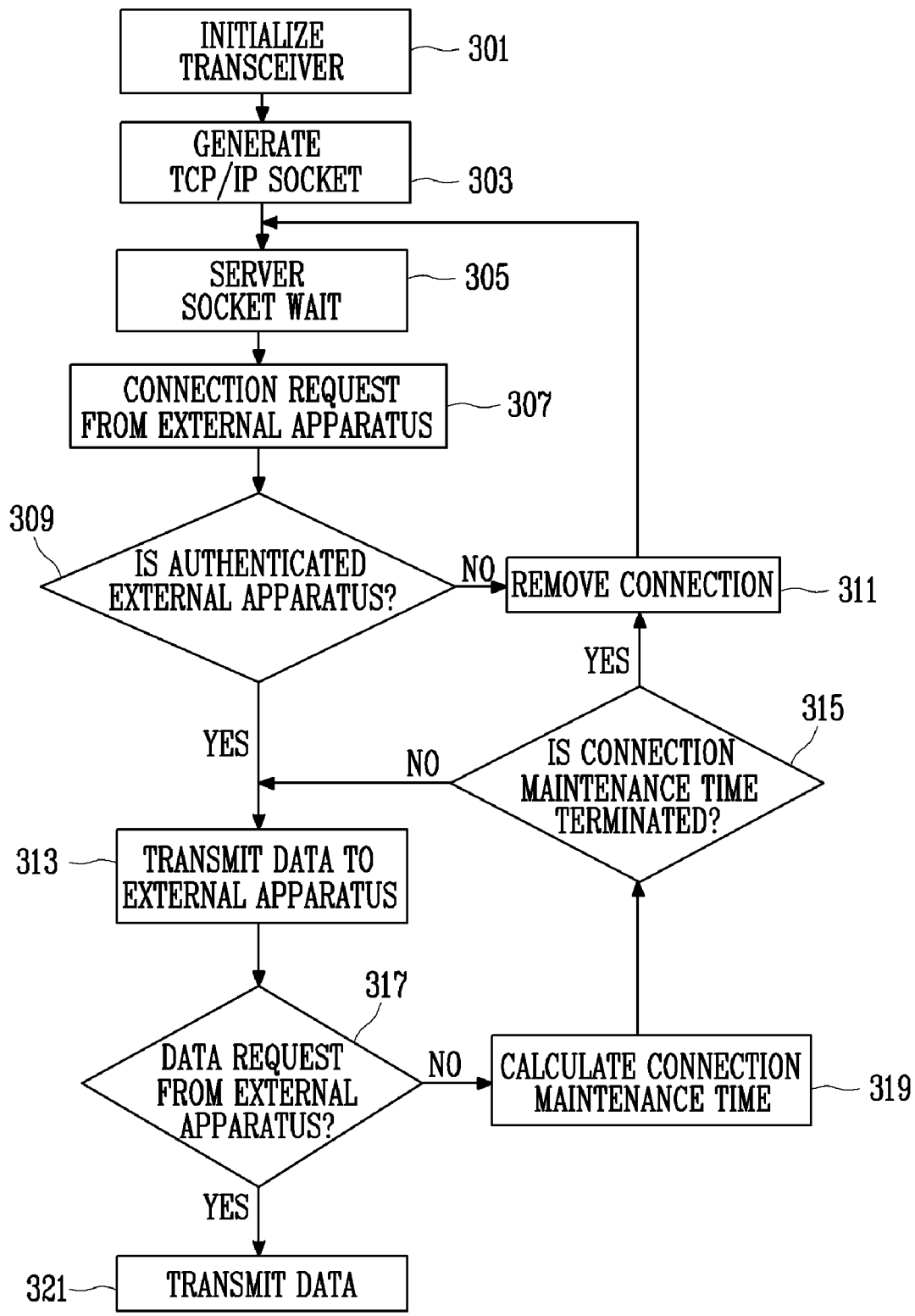
FIG. 3 is a flowchart illustrating a connection to an external apparatus for transmission of GPS data according to an exemplary embodiment of the present invention.

FIG. 3 is a flowchart illustrating a connection to an external apparatus to transmit GPS data according to an exemplary embodiment of the present invention.

Referring to FIG. 3, a network communication part is initialized in order to be connected to an external apparatus (Step 301). A TCP/IP socket for a connection to the external apparatus is generated (Step 303). The generated socket is a server socket, and waits for a connection request from the external apparatus (Step 305). When the connection request from the external apparatus is received (Step 307), it is determined whether the external apparatus from which the connection request is transmitted is an authenticated external apparatus or not (Step 309) in order to connect to the external apparatus.

The authentication of the external apparatus is performed by a security access controller by confirming information on the external apparatus stored in a memory to thereby authenticate the external apparatus.

As a result of the authentication, when the external apparatus is an authenticated external apparatus, the connection to the external apparatus is maintained (Step 313). Subsequently, it is determined whether the external apparatus requests data (Step 317). When the apparatus requests data, the data corresponding to the request is transmitted (Step 321). Otherwise, connection maintenance time is calculated (Step 319).

After it is determined whether previously set connection maintenance time is terminated or not (Step 315), the connection is released when any request is not received during the connection maintenance time, and the socket waits for a connection request from an external apparatus (Step 311).

Meanwhile, when the external apparatus requesting the connection is not an authenticated external apparatus, the connection is released and the socket waits for a connection request from an external apparatus again (Step 311).

FIG. 4 is a flowchart illustrating connection management of an external apparatus performed by a network management part according to an exemplary embodiment of the present invention.

The network management part may be connected to an operator external apparatus to thereby change data of an external apparatus connected through a network or may be connected to a typical external apparatus to thereby change a connection status of the apparatus.

The network management part is connected to the external apparatus using a connection method different from a connection method for data communication. In particular, when the TCP/IP protocol is used, a connection port for data transmission is different from that for communication of the network management part.

Referring to FIG. 4, the network communication part is initialized to be connected to an external apparatus (Step 401). Afterwards, a TCP/IP socket for a connection to an external apparatus is generated (Step 404). Connection port information of the generated TCP/IP socket uses a port different from the socket connection port of FIG. 3.

The generated socket is a server socket, and waits for a connection request from an external apparatus (Step 405). When the connection request from an external apparatus is received (Step 407), it is determined whether the external apparatus from which the connection request is transmitted is an authenticated external apparatus or not (Step 409) to establish a connection to the apparatus.

The authentication of the external apparatus is performed by a security access controller by confirming information on external apparatuses stored in a memory to thereby authenticate the external apparatus. In particular, when a connection for network management is established, a connection of the operator external apparatus may be subjected to authentication as well.

As a result of the authentication, when the apparatus is an authenticated external apparatus, the connection to the external apparatus is maintained (Step 413). Then, a type of the connected external apparatus is determined (Step 417). When the connected external apparatus is the operator external apparatus, the request is analyzed (Step 419) to thereby change an external apparatus information database according to the request from the external apparatus (Step 421), to thereby execute a connection management program (Step 423) or to thereby change a connection setup (Step 425). Here, the external apparatus information database includes information on a connectable external apparatus. Also, the external apparatus information database may include a current connection status of an external apparatus as well.

Meanwhile, when the connected external apparatus is a typical external apparatus, the request is analyzed (Step 427) to thereby release or maintain the connection to the external apparatus (Step 429), or to thereby remove or confirm an external apparatus connection database (Step 431), otherwise security information is changed (Step 433). The external apparatus connection database includes information on a currently connected external apparatus. The external apparatus connection information database may include information on a connectable external apparatus as well.

Meanwhile, when the external apparatus is neither the operator external apparatus nor the typical external apparatus (Step 417), it is determined whether a previously setup connection maintenance time has been terminated or not (Step 415), so that the connection is released when there is no request during the connection maintenance time, and the socket waits for a connection request from an external apparatus (Step 411).

When the external apparatus that requests a connection is not an authenticated external apparatus (Step 409), the connection is removed and the socket waits for a connection request from an external apparatus again (Step 411).

Here, the operator external apparatus is an apparatus used when an operator is directly connected to the GPS apparatus to thereby change a setup or data of the apparatus. Also, the typical apparatus is an apparatus that is connected to the GPS apparatus and uses GPS data.

FIG. 5 illustrates data stored in a memory according to an exemplary embodiment of the present invention.

Referring to FIG. 5, Table 500 represents a database in which a received GPS signal is stored. Reference numeral 501 represents a sequence of data. Reference numeral 503 represents a type of data. In other words, it denotes a type of location-related information that can be obtained from a GPS, such as location, time, direction, velocity, etc. Reference 505 represents a format applied to each data. Reference numeral 507 represents what each data indicates.

For example, a direction that is a fifth item is represented in a unit of radian and has an angle of 1 to 360 degrees (0 to $2\pi$).

Table 510 represents a database for managing an external apparatus.

Reference numeral 511 represents a sequence of an external apparatus connected to the GPS apparatus. Reference numeral 512 represents a connection recognition name of the external apparatus, and reference numeral 513 represents a machine address code (MAC) of the connected external apparatus. Reference numeral 514 represents a method of authentication when the external apparatus is connected to the GPS apparatus. Reference 515 represents whether a current connection status is an authenticated connection or not, and reference numeral 516 represents access time when the external apparatus accesses an apparatus management database. Reference numeral 517 represents requirements that the external apparatus currently requests.

For example, a first external apparatus is a local area network (LAN) connected through a USB apparatus and has a MAC address of 112233445566. The apparatus is authenticated by inputting a password, and its authentication status is valid. Also, database access time is 1 Aug. 2006, 13:42:20. Furthermore, the external apparatus requests registration of the apparatus.

Table 520 represents a database for connection security of an external apparatus.

Reference numeral 521 represents a sequence of an external apparatus connected to the GPS apparatus. Also, reference numeral 522 represents a connection recognition name of the external apparatus, and reference numeral 523 represents an authentication method when the external apparatus is connected to the GPS apparatus. Reference numeral 524 represents existence of an authentication key according to the authentication method. Reference numeral 525 represents registration time of the authentication key. Reference numeral 526 represents a validity term of the authentication key. Reference numeral 527 represents requirements that the current external apparatus requests.

For example, a first external apparatus is a LAN connected through a USB apparatus, and is authenticated by inputting a password, which is also an authentication key for the external apparatus, i.e., a connection password is Xx22yy. The registration time of the authentication key is 2 Aug. 2006, 09:30:14, and the validity term of the password extends until 1 Sep. 2006, 09:30:14. That is, the apparatus may be effectively connected using the password within 30 days.

These databases are stored in a memory of the GPS apparatus, and as shown in FIG. 4, and the data may be changed or removed depending on the circumstances.

According to the present invention, a method and apparatus for providing GPS data using a network can be provided.

Also, according to the present invention, a method and apparatus for providing GPS data capable of simultaneously providing GPS data to various types of external apparatuses requesting the GPS data using a TCP/IP protocol can be provided.

In addition, according to the present invention, a method and apparatus for providing GPS data capable of simultaneously providing GPS data to devices that use GPS data in a vehicle having an internal network by means of the internal network of the vehicle can be provided.

In the drawings and specification, there have been disclosed typically preferred embodiments of the invention and, although specific terms are employed, they are used in a generic and descriptive sense only and not for purposes of limitation. As for the scope of the invention, it is to be set forth in the following claims. Therefore, it will be understood by those of ordinary skill in the art that various changes in form and details may be made therein without departing from the spirit and scope of the present invention as defined by the following claims.

What is claimed is:

1. A network global positioning system (GPS) terminal comprising:
   a GPS receiver receiving GPS data;
   a GPS processor processing the received GPS data to a predetermined form;
   a network communication part communicating with an external apparatus through a network in order to receive a request for the GPS data from the external apparatus, and transmit the processed GPS data to the external apparatus in response to the request;
   a security access controller authenticating the external apparatus; and
   a network management part managing connection information and security information of the external apparatus, the network communication part simultaneously communicating with at least one external apparatus using a TCP/IP protocol.

2. The terminal of claim 1, wherein the GPS receiver comprises a GPS antenna receiving a satellite GPS signal.

3. The terminal of claim 1, wherein the GPS receiver comprises a mobile communication antenna receiving a signal of a mobile communication network including GPS data.

4. The terminal of claim 1, wherein the GPS processor processes the GPS data into a form usable by the external apparatus requesting the GPS data.

5. The terminal of claim 1, further comprising a memory including GPS data, and connection information and security information of an external apparatus.

6. The terminal of claim 5, wherein the GPS data in the memory comprises information on current time, velocity, longitude, latitude, and a location angle.

7. The terminal of claim 5, wherein the connection information of the external apparatus in the memory comprises information on an apparatus recognition number, an authentication key, an authentication method, registration time of the authentication key, and a validity term of the authentication key.

8. The terminal of claim 5, wherein the security information of the external apparatus in the memory comprises information on an apparatus recognition number, a machine address code (MAC), an authentication method, and a registration time.

9. The terminal of claim 1, wherein the security access controller restricts or allows access of the external apparatus.

10. A method of providing GPS data using a network, comprising the steps of:
    (a) receiving GPS data;
    (b) processing the received GPS data into a predetermined form;
    (c) coupling with an external apparatus through a network;
    (d) receiving a request for the GPS data from the external apparatus coupled through the network;
    (e) authenticating the external apparatus; and
    (f) transmitting the processed GPS data to the authenticated external apparatus through the network, communication with the external apparatus being performed using a TCP/IP protocol.

11. The method of claim 10, wherein step (a) comprises the steps of:
    initializing a GPS receiver;
    periodically confirming whether the initialized GPS receiver receives a signal including GPS data;
    extracting GPS data from the signal including the GPS data; and
    storing the extracted GPS data in a memory,
    wherein when the extracted GPS data is unnecessary, the received data is discarded.

12. The method of claim 10, wherein step (b) comprises the step of converting the received GPS data into a packet form usable by a TCP/IP protocol.

13. The method of claim 10, further comprising the step of storing the connection information of the external apparatus coupled through the network in an external apparatus connection information database.

14. The method of claim 10, wherein step (e) comprises the steps of:
    confirming whether an authentication key of the external apparatus exists in a memory or not;
    confirming whether a response key corresponding to the authentication key of the memory is received from the external apparatus or not; and confirming whether a validity term of the authentication key is expired or not.

15. The method of claim 10, further comprising the steps of:
   receiving a request for changing management information from the authenticated external apparatus; and
   analyzing the change request to thereby change at least one of external apparatus information, an external apparatus connection management program, and an external apparatus connection setup.

16. The method of claim 10, further comprising the steps of:
   receiving a request for changing connection information from the authenticated external apparatus; and
   analyzing the change request to thereby change at least one of external apparatus security information, an external apparatus connection status, and external apparatus connection information.

17. A global positioning system (GPS) terminal comprising:
   a GPS means for receiving GPS data and processing the received GPS data to a predetermined form;
   a network communication means for communicating with an external apparatus through a network in order to receive a request for the GPS data from the external apparatus, and transmit the processed GPS data to the external apparatus in response to the request;
   a security access means for authenticating the external apparatus; and
   a network management means for managing connection information and security information of the external apparatus, the network communication means communicating with at the external apparatus using a TCP/IP protocol.

18. The GPS terminal of claim 17, further comprising a memory means for storing GPS data, and connection information and security information of the external apparatus.

19. The GPS terminal of claim 18, wherein the connection information of the external apparatus in the memory means comprises information on an apparatus recognition number, an authentication key, an authentication method, registration time of the authentication key, and a validity term of the authentication key.

20. The GPS terminal of claim 18, wherein the security information of the external apparatus in the memory means comprises information on an apparatus recognition number, a machine address code (MAC), an authentication method, and a registration time.

* * * * *